UNITED STATES PATENT OFFICE.

ALONZO RAMSDELL, OF CHICAGO, ILLINOIS.

COMPOSITION OF MATTER AND PROCESS OF MANUFACTURING SAME.

SPECIFICATION forming part of Letters Patent No. 716,276, dated December 16, 1902.

Application filed November 4, 1901. Serial No. 81,000. (No specimens.)

*To all whom it may concern:*

Be it known that I, ALONZO RAMSDELL, a citizen of the United States, residing at Chicago, in the county of Cook and State of Illinois, have invented a certain new and Improved Composition of Matter and Process of Manufacturing the Same, of which the following is a specification.

My invention relates to metallic compositions and to the manufacture of the same, and has for its object to produce from ordinary cast-iron a metallic composition suitable for use in manufacturing agricultural implements and similar articles.

I have discovered that a superior composition may be made from cast-iron by treating it under suitable conditions with a small proportion of lead. The specific method of procedure which I have found to produce the best results consists in taking cast-iron and melting it in any suitable apparatus and afterward allowing it to cool until it becomes somewhat reddish in tint, but is still in a molten condition. For each one hundred pounds of the molten cast-iron I then add nine ounces of lead and stir the mixture, afterward allowing the mass to cool. The result is a product which by reason of its hardness, smoothness, wearing qualities, and freedom from liability to rust is peculiarly fitted for the manufacture of agricultural implements and similar articles, although it may be used for any other purpose to which it is adapted. The proportion of lead added may be varied to some extent, as I have found that a very satisfactory product may be produced by using lead in substantially the proportion of from nine to fifteen ounces to each one hundred pounds of cast-iron.

It should be understood that my invention includes the use of equivalent substances instead of those named.

The application of the lead is usually made when the molten iron is in the ladle from which it is poured into the mold or molds, for when iron which has been treated is again melted it requires re-treating with lead in order to produce the same product.

That which I claim as my invention, and desire to secure by Letters Patent, is—

1. The composition of matter which consists of cast-iron and lead in the proportion, substantially, of one hundred pounds of cast-iron to from nine to fifteen ounces of lead, the ingredients being mixed and stirred while in a molten condition, substantially as described.

2. The composition of matter formed by melting cast-iron and adding lead thereto while the iron is in a molten condition, in the proportion of substantially nine to fifteen ounces of lead to each one hundred pounds of iron, substantially as described.

3. The method of treating cast-iron which consists in melting the same and adding lead thereto, while still in a molten condition, in the proportion of from nine to fifteen ounces of lead to one hundred pounds of cast-iron, substantially as described.

4. The method of treating cast-iron which consists in melting the same and adding lead thereto, while still in a molten condition, in the proportion of from nine to fifteen ounces of lead to one hundred pounds of cast-iron, and then stirring the mixture, substantially as described.

5. The method of treating cast-iron which consists in melting the same, allowing it to cool until it assumes a reddish color, then adding thereto, while still in a molten condition, from nine to fifteen ounces of lead to each one hundred pounds of iron, and then mixing the ingredients, substantially as described.

ALONZO RAMSDELL.

Witnesses:
JULIA M. BRISTOL,
LESTER L. BOND.